(12) United States Patent
Yao (10) Patent No.: US 10,276,901 B2
(45) Date of Patent: Apr. 30, 2019

(54) DAMAGE DETECTION AND WARNING SYSTEM OF A BATTERY PACK

(71) Applicant: VOLVO CAR CORPORATION, Gothenburg (SE)

(72) Inventor: Jianfeng Yao, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 247 days.

(21) Appl. No.: 15/171,536

(22) Filed: Jun. 2, 2016

(65) Prior Publication Data

US 2016/0365611 A1 Dec. 15, 2016

(30) Foreign Application Priority Data

Jun. 9, 2015 (EP) .................................... 15171113

(51) Int. Cl.
| | |
|---|---|
| *H01M 10/48* | (2006.01) |
| *H01M 10/42* | (2006.01) |
| *H01M 2/10* | (2006.01) |
| *G01L 1/24* | (2006.01) |
| *G01L 5/00* | (2006.01) |
| *B60L 11/18* | (2006.01) |

(Continued)

(52) U.S. Cl.
CPC ............ *H01M 10/482* (2013.01); *B60K 1/04* (2013.01); *B60L 11/1851* (2013.01); *G01L 1/243* (2013.01); *G01L 5/0052* (2013.01); *H01M 2/1077* (2013.01); *H01M 10/4257* (2013.01); *H01M 10/48* (2013.01); *H01M 10/488* (2013.01); *B60K 2001/0438* (2013.01); *B60Y 2306/01* (2013.01); *G01B 11/18* (2013.01); *H01M 2010/4271* (2013.01); *H01M 2220/20* (2013.01)

(58) Field of Classification Search
CPC ....... H01M 10/48; H01M 10/42; H01M 10/40
See application file for complete search history.

(56) References Cited

U.S. PATENT DOCUMENTS

| | | | |
|---|---|---|---|
| 2006/0250262 | A1 | 11/2006 | Song |
| 2011/0262786 | A1 | 10/2011 | Fuse |
| 2012/0105835 | A1 | 5/2012 | Fuse |

(Continued)

FOREIGN PATENT DOCUMENTS

| | | |
|---|---|---|
| CZ | 282835 | 10/1997 |
| JP | 2015099711 | 5/2015 |

OTHER PUBLICATIONS

Machine Translation of: Takahashi et al., JP 2015/099711, May 28, 2015.*

(Continued)

*Primary Examiner* — Kenneth J Douyette
(74) *Attorney, Agent, or Firm* — Brooks Kushman P.C.

(57) ABSTRACT

An energy storage module for a vehicle includes an energy storage enclosure adapted to accommodate an energy storage cell, the energy storage enclosure having an enclosure wall, an optical sensor including an optical fiber, an optical receiver and an optical emitter, the optical fiber attached to an inner side of a first enclosure wall along a distance of a portion of the inner side. The optical receiver is configured to detect an optical signal transmitted through the optical fiber, and the optical sensor is configured to detect an alteration of the optical signal being indicative of a deformation.

14 Claims, 5 Drawing Sheets

(51) Int. Cl.
*B60K 1/04* (2019.01)
*G01B 11/16* (2006.01)

(56) References Cited

U.S. PATENT DOCUMENTS

2013/0295419 A1  11/2013  Kwon et al.
2014/0203783 A1   7/2014  Kiesel et al.
2014/0329120 A1* 11/2014  Cui ..................... H01M 10/48
                                                    429/90

OTHER PUBLICATIONS

Annex to Communication from the European Patent Office for Application No. EP151711132, dated Mar. 21, 2018, 6 pages.
Extended European Search Report for European Application No. EP 151711132, Completed by the European Patent Office, dated Nov. 26, 2015, 9 Pages.

* cited by examiner

DAMAGE DETECTION AND WARNING SYSTEM OF A BATTERY PACK

CROSS-REFERENCE TO RELATED APPLICATIONS

This application claims foreign priority benefits under 35 U.S.C. § 119(a)-(d) to European patent application number EP 15171113.2, filed Jun. 9, 2015, which is incorporated by reference in its entirety.

TECHNICAL FIELD

The present disclosure relates to an energy storage module, to an energy storage system, and to a method for assessing a deformation of an energy storage enclosure for an energy storage module.

BACKGROUND

Electric and hybrid vehicles have recently become a more common sight on roads worldwide. They have one thing in common and that is they all require a large and powerful rechargeable energy storage, also known as a battery. In most such batteries, several battery cells are stacked together to form a battery powerful enough to provide energy for the vehicle to drive for example several tens of kilometers. The battery cells are in most cases mechanically fixed together with a common frame or enclosure to form a single unit which is conveniently mounted in the vehicle. Furthermore, the size of a battery providing sufficient power for driving an electric or hybrid vehicle is relatively large, whereby the battery cells tend to be closely packed in order to reduce the size of the battery.

The high powers of the batteries constitute a high risk, in particular for passengers of the vehicle carrying the battery but also for the vehicle itself which may be damaged by a faulty battery. For example, in case of an accident causing an impact on the battery, a short circuit may occur which may result in a fire. Another example is that an impact caused by e.g. a rock may damage the battery in an unknown way. For example, the rock (or another object) may hit the battery from below the vehicle.

One example of an apparatus with an electronic sensor for detecting external physical impact is disclosed in US20060250262.

However, it is desirable to be able to more accurately assess the damage caused by an external impact in order to better determine what actions need to be taken depending on the damage.

Therefore, there is a need for improved system for damage detection in batteries for electric and hybrid vehicles.

SUMMARY

In view of the above, it is a general object of the present disclosure to provide improved damage detection in energy storage modules for vehicles, in particular for electric vehicles.

According to a first embodiment of the present disclosure there is provided an energy storage module for a vehicle, the energy storage module comprising:
- an energy storage enclosure adapted to accommodate at least one energy storage cell, the energy storage enclosure comprises at least one enclosure wall; and
- at least a first optical sensor comprising at least a first optical fiber, at least a first optical receiver and an optical emitter, wherein the optical fiber is attached to an inner side of at least a first enclosure wall of the energy storage enclosure, the optical fiber is attached to the inner side along a distance of at least a portion of the inner side, the optical emitter being configured to emit an optical signal through the first optical fiber, and the optical receiver is configured to detect the optical signal transmitted through the first optical fiber,
- wherein the optical sensor is configured to detect an alteration of the optical signal, the alteration being indicative of a deformation of the first enclosure wall.

The present disclosure is based on the realization that an energy storage module, e.g. a battery pack, may be subjected to an impact which may damage the energy storage enclosure and thereby parts housed inside the energy storage enclosure (e.g. energy storage cells, cooling systems, printed circuit boards, etc.) without the user noticing the damage. By continuing using the damaged energy storage module, more severe accidents may occur. It is further realized that in case of an accident, the energy storage module may be damaged in an unknown way. In that case there is a risk of improper handling of the energy storage module which could cause a hazardous situation for people handling the vehicle after the accident without being able to access the energy storage module. It is realized that by attaching an optical fiber to the inner side of the energy storage enclosure, a deformation of the energy storage enclosure may be detected by analyzing an optical signal transmitted through the optical fiber. If the energy storage enclosure is in some way deformed, temporarily or permanently, the optical fiber being in contact with the energy storage enclosure in the region of the deformation will also deform. The optical signal transmitted through the fiber will be altered as a result of the deformation, and thereby the alteration is an indication of the deformation of the energy storage enclosure. It is further realized that the optical fiber should be arranged on the inside of the energy storage enclosure in order to avoid or at least reduce the occurrence of false indications of deformations due to direct impact of external objects or forces on the optical fiber. Furthermore, another advantage of the present disclosure is that the use of optical sensors based on deformation of optical fibers eliminates or at least alleviates issues related to electromagnetic interference.

The energy storage enclosure should be understood as a housing which may accommodate energy storage cells suitable for providing power to an engine for providing propulsion to an electrical or hybrid vehicle. The energy storage cells may for example be Li-ion cells. The energy storage cells may be stacked in the energy storage enclosure. Optionally, there may be cooling plates interleaved with the energy storage cells in the stack.

The "enclosure wall" may be any of a side wall, a top (e.g. the "lid") of the enclosure, a bottom of the enclosure, or a bottom tray portion of the energy storage module. Thus, the term "wall" should be interpreted broadly.

The inner side is the side of the energy storage enclosure wall facing in the direction of the energy storage cells if arranged in the energy storage enclosure.

The optical fiber is attached to an enclosure wall of the energy storage enclosure. For example, the optical fiber may be glued, or attached by means of adhesive tape, or any other adhesion method or product, or the optical fiber may be attached using e.g. epoxy resin or a similar product as long as the optical fiber is deformed if attached in a region where the enclosure wall is being deformed by a physical impact, e.g. an external force. Alternatively or additionally, the fiber may be covered by e.g. foam, a plastic belt, or a metal sheet for fixation. The optical fiber may be attached along a distance of at least a portion of the inner side to follow the surface of the inner side. This means that the optical fiber is attached over a distance of the enclosure wall larger than a point attachment. For example, the optical fiber may be attached from a first end portion to second end portion of the first enclosure wall. The distance may for example cover the entire length of the enclosure wall, or only a few percent of the length of the enclosure wall, however, more than just a single point. By detecting an alteration of the optical signal transmitted through the optical fiber, a deformation of the enclosure wall may be detected. The optical fiber may be for example a single core or multi-core optical fiber.

A deformation of an enclosure wall may be a change in the shape of the enclosure wall. For example, an impact by a rock or another object, or in case of an accident, there may be a local change in the shape at the location of the impact. Thus, a deformation is an alteration of the form, geometry, cross-section, or shape of the enclosure wall, and/or the deformation may be an intrusion on the enclosure wall.

The optical emitter is a device arranged to emit light, for example, the optical emitter may comprise a light-emitting diode, a laser, or another solid state light source. The optical receiver may be a device capable of converting light into an electronic signal. For example, an optical receiver may be a photodetector.

According to an embodiment of the disclosure, the energy storage module may further comprise a second optical sensor comprising a second optical fiber attached to the same first enclosure wall as the first optical fiber and spaced apart from the first optical fiber, and a second optical receiver configured to detect an optical signal transmitted through the second optical fiber, wherein the second optical sensor is configured to detect an alteration of the optical signal transmitted through the second optical fiber. By attaching a second fiber to the same enclosure wall, it is possible to more accurately locate a deformation of the enclosure by determining in which of the fibers an alteration of the optical signal is detected and relating the optical fibers to their locations on the enclosure walls.

According to an embodiment of the disclosure, the energy storage module may further comprise a second optical sensor comprising a second optical fiber attached to an enclosure wall of the energy storage enclosure different from the enclosure wall which the first optical fiber is attached to, and a second optical receiver configured to detect an optical signal transmitted through the second optical fiber, wherein the second optical sensor is configured to detect an alteration of the optical signal transmitted through the second optical fiber. In this way, it is possible to determine which enclosure wall is deformed.

According to an embodiment of the disclosure, each of the optical fiber(s) may have a respective optical receiver and a respective optical emitter. For example, the second optical sensor may comprise an optical emitter. The optical sensor may be more robust and less sensitive to damages by providing each fiber with its own optical receiver and optical emitter.

One optical emitter may be arranged to emit light through more than one optical fiber, and wherein each optical fiber has a respective optical receiver. For example, the first and the second optical sensors may share an optical emitter.

The alteration of an optical signal may be an alteration of an optical transmission property of a respective one of the optical fiber(s). For example, if the optical fiber is bent, or in other ways deformed, the optical path through the optical fiber is altered. Thereby the transmission of the optical signal is altered and may be detected by the optical sensor.

According to an embodiment of the disclosure, the optical sensors may be connected to a control unit, wherein the control unit may be configured to determine a magnitude and/or a location of the deformation of the enclosure wall based on the detected alteration of an optical signal. Thus, the control unit may relate the detected alteration to a magnitude of the deformation of the enclosure wall. For this reason, an altered optical transmission may be related through experimental data to the amount of deformation of the optical fiber. For example, there may be a predetermined data set of bending radius of the optical fiber versus a fraction of light loss through the optical fiber. Alternatively or additionally, there may be a predetermined data set of pressing force (or pressure applied, or amount of compression of) applied to the optical fiber versus a fraction of light loss. The pressure or pressing force causes the fiber to be compressed which result in an amount of compression of the fiber which causes that less light is allowed to pass through the fiber. In a similar way, bending of the optical fiber causes that less light is allowed to pass through the fiber. Alternatively or additionally, the control unit may relate the detected alteration to a location of the deformation of the enclosure wall. Note that the "location" may relate to a location/region on an enclosure wall, or "location" may also relate to which of the enclosure walls has been deformed.

According to an embodiment of the disclosure, the control unit may be configured to determine a severity of an impact based on the detected alteration of any of the optical signals. The control unit may determine from a combination of the magnitude of the deformation and the location of the deformation, a degree of severity. For example, a relatively small deformation may not be determined as having a high degree of severity, or a deformation in a less sensitive region (e.g. a region not in close proximity to an energy storage cell) of the energy storage module may not be determined as having a high degree of severity. Furthermore, a deformation in a sensitive region of the energy storage enclosure may be determined to be severe, or a relatively large deformation may be determined to be severe. A combination of location of the deformation and the magnitude of the deformation may also be used to determine the severity of the deformation.

According to an embodiment of the disclosure, the severity may be determined based on determining a location of a deformation of an enclosure wall, wherein the location is determined by relating a detected alteration of an optical signal transmitted through any of the optical fibers to the location of the respective optical fiber.

The severity may be determined based on a magnitude of the deformation of the enclosure wall, where the magnitude is determined by relating the alteration of the optical signal through an optical fiber to a deformation of a respective optical fiber.

According to a second embodiment of the disclosure there is provided an energy storage system comprising an energy storage module according to any one the preceding embodiments, and further comprising the control unit.

According to an embodiment of the disclosure, the control unit may be configured to transmit a warning signal to a user interface in case the severity exceeds a threshold. The user interface may for example be part of the control panel inside the vehicle (e.g. a head-up display), or it may be part of an external device connected to the control unit. The external device may for example be useful if the vehicle was subjected to an accident. The warning signal may inform the driver of the deformation and instruct the driver to immediately pull over and turn off the vehicle, or the warning signal may instruct the driver to proceed to a service station for maintenance. The warning signal may be a sound signal or a visual signal/indicator, or a combination, for example shown on a head-up display.

The control unit may be one of: control unit of a supplement restraint system (SRS) for a vehicle or battery management system control unit of the energy storage module. Of course control units of other parts of the vehicle may also function for the purpose of this disclosure.

Further effects and features of this second embodiment of the present disclosure are largely analogous to those described above in connection with the first embodiment of the disclosure.

According to a third embodiment of the disclosure there is provided a method for assessing a deformation of an energy storage enclosure for an energy storage module, the deformation being caused by an external force, the energy storage enclosure comprising at least a first enclosure wall, wherein an optical fiber is attached to the first enclosure wall, the method comprising the steps of:

monitoring the transmission of an optical signal transmitted through the at least one optical fiber;

determining an alteration of the optical signal, the alteration being indicative of a deformation of the first enclosure wall; and According to an embodiment of the disclosure, the method may further comprise: based on the alteration of the optical signal, determining a severity of an impact on the energy storage module.

if the severity exceeds a threshold value, providing a warning message to a user.

Further effects and features of this third embodiment of the present disclosure are largely analogous to those described above in connection with the first and the second embodiments of the disclosure.

The energy storage cell(s) may be Li-ion battery cell(s).

The control unit may comprise one or more processors, microprocessors, microcontrollers, programmable digital signal processors or other programmable devices, which may include memory. The control unit may also, or instead, comprise an application specific integrated circuit, a programmable gate array or programmable array logic, a programmable logic device, or a digital signal processor. Where the control unit comprises a programmable device such as a processor, microprocessor, microcontroller or programmable digital signal processor mentioned above, the control unit may further comprise computer executable code stored in memory that when executed controls operation of the control unit and/or performs the functions and/or operations described herein.

There is further provided a vehicle comprising the energy storage module. The vehicle may be an electric or hybrid vehicle.

Further features of, and advantages with, the present disclosure will become apparent when studying the appended claims and the following description. The skilled person realizes that different features of the present disclosure may be combined to create embodiments other than those described in the following, without departing from the scope of the present disclosure.

BRIEF DESCRIPTION OF THE DRAWINGS

The present disclosure will now be described in more detail, with reference to the appended drawings showing various embodiments of the disclosure, wherein.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In the following description, the present disclosure is mainly described with reference to an energy storage module for an electric or hybrid vehicle in the form of a car. However, the disclosure may be applied to any type of electric or hybrid vehicle such as a truck, a fork lift, a boat, etc.

Figure 1A:
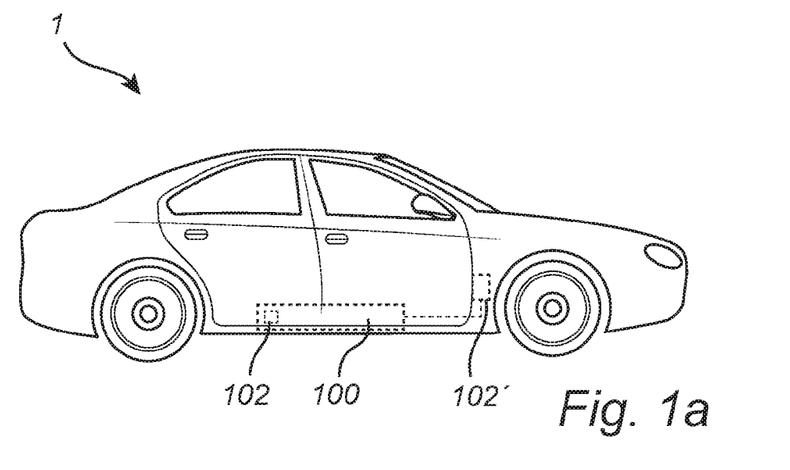
FIG. 1a schematically shows an example application for an example embodiment of an energy storage module.

FIG. 1a illustrates an electric vehicle 1 comprising an energy storage module 100. The energy storage module 100 (300) is configured to provide power for operating the electric vehicle 1, thus the energy storage module 100 (300) may be arranged to provide power to an electric motor for providing propulsion for the electric vehicle 1. The electric vehicle 1 is depicted as an electric car, however any other vehicle, such as e.g. a truck is also suitable. The energy storage module 100 (300) of this electric vehicle 1 may be an energy storage module 100 (300) according to example embodiments of the present disclosure. There is further a control unit 102 or 102' which may either be part of the battery management system (control unit 102) of the energy storage module 100, or be a control unit of a supplement restraint system 102' of the vehicle 1. The function of the control unit 102 or 102' in accordance with embodiments of the disclosure will be described with reference to subsequent drawings.

Figure 1B:
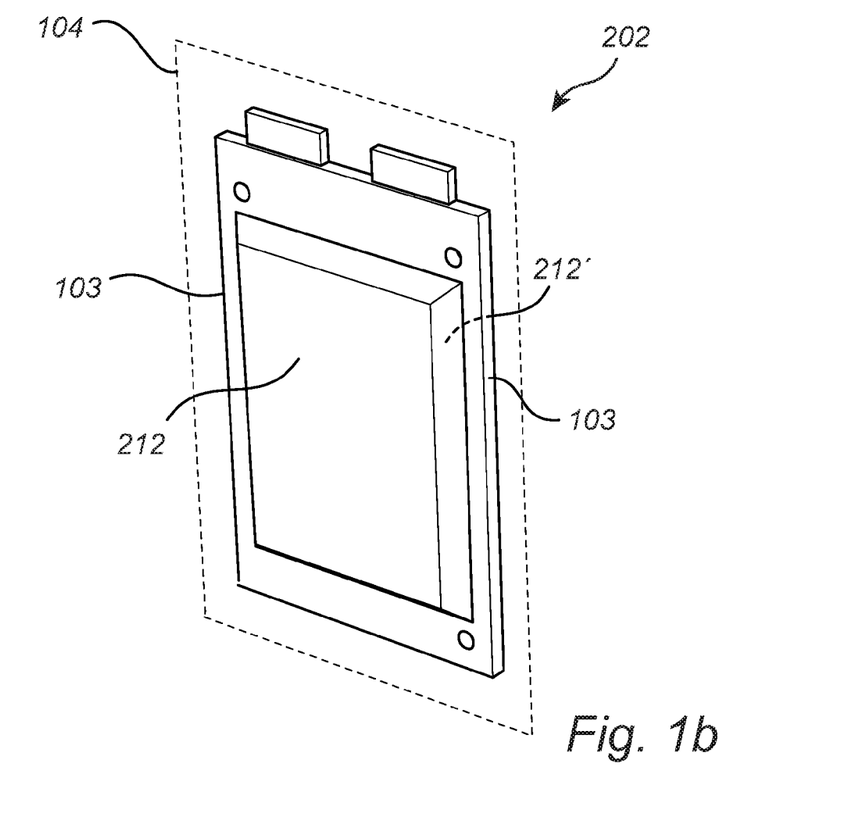
FIG. 1b illustrates an example energy storage cell.

FIG. 1b illustrates an example of an energy storage cell 202 (203, 204). The energy storage cell 202 is planar and has a main extension in a plane 104. The energy storage cell 202 has a surface portion 212 and an edge portion 103 around the perimeter of the planar energy storage cell 202. The energy storage cell may thus comprise two opposite surface portions 212, 212' interconnected by the edge portion 103.

Figure 1C:
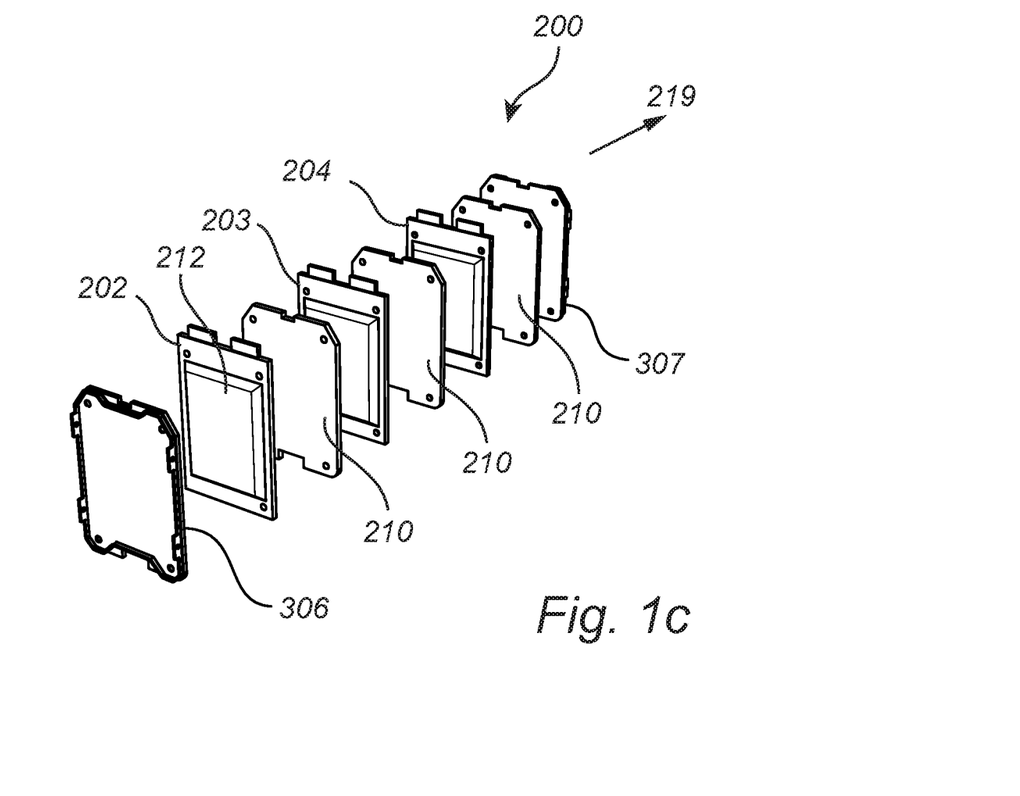
FIG. 1c illustrates an example stack of energy storage cells and cooling plates.

FIG. 1c illustrates energy storage cells 202, 203, 204 stacked in a stacking direction 219 as an example arrangement of energy storage cells. There is also cooling plates 210 interleaved with the energy storage cells 202-204, and optionally end plates 306, 307 at the ends of the stack.

Figure 2A:
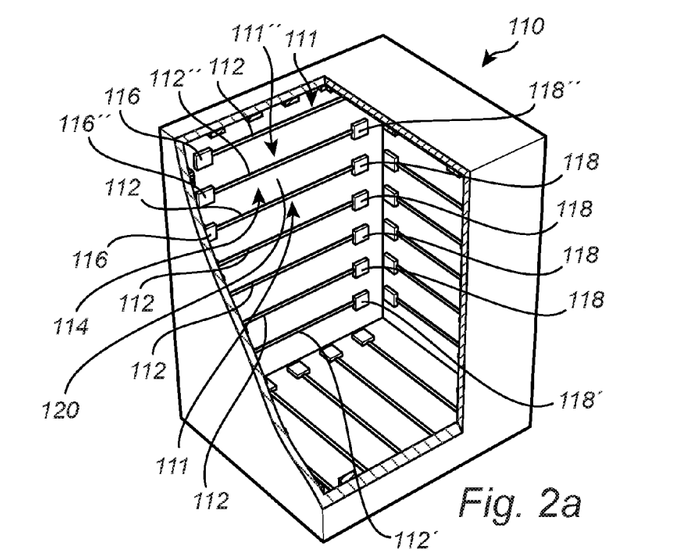
FIG. 2a shows an example energy storage enclosure with optical sensors.

FIG. 2a illustrates an energy storage enclosure 110 adapted to accommodate energy storage cells 202-204. Inside the energy storage enclosure 110, there is more than one optical fiber 112 (112', 112") attached to the inner side 114 of one of the enclosure walls 120. Each of the optical fibers 112 has a respective optical emitter 116 (not all are visible, not all are numbered) configured to emit an optical signal into the respective optical fiber 112. There is further an optical receiver 118 (not all are visible, not all are numbered) arranged to receive and detect the optical signal at the output side of the optical fiber 112, after the optical signal has been transmitted through the optical fiber 112. An optical fiber 112, an optical emitter 116 and an optical receiver 118 together form an optical sensor 111 (not all are numbered). The energy storage enclosure 110 will now be described as part of an example energy storage module 300.

Figure 2B:
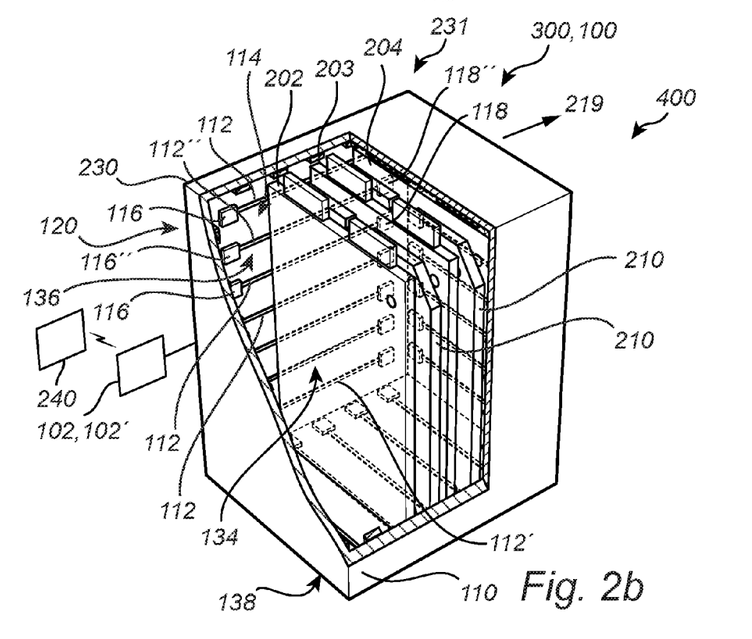
FIG. 2b shows an example energy storage module according to an embodiment of the present disclosure.

FIG. 2b illustrates an energy storage module 300 (100) according to an example embodiment of the disclosure. The energy storage module 300 comprises an enclosure 110 (also shown in FIG. 2a) having arranged therein energy storage cells 202-204. Thus, the enclosure 110 accommodates the energy storage cells 202-204. In this example embodiment, the enclosure 110 accommodates several energy storage cells 202, 203, 204 arranged in parallel (thus the respective planes 104 are substantially parallel with each other), and optionally also cooling plates 210. There may further be other parts which are not shown that may be part of the energy storage module, for example, parts interconnecting energy storage cells and cooling plates such as plastic frames, foam, steel/plastic end plates and etc. For example, there may be end plates 306, 307 arranged at the end of the stack of energy storage cells 202-204. In FIG. 2b, the energy storage cells 202, 203, 204, and the cooling plates 210 are stacked in a stacking direction 219 as is illustrated in the exploded view in FIG. 1c. The energy storage cells 202, 203, 204 may be Li-ion battery cells.

Figure 5:
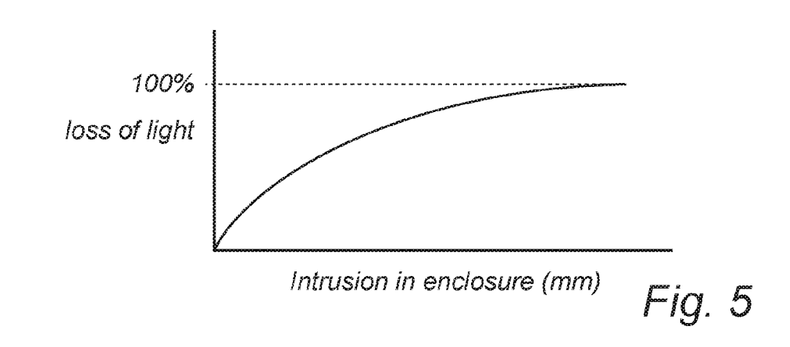
FIG. 5 shows example data relating loss of light in an optical fiber to the intrusion in the energy storage enclosure.

Furthermore, in FIG. 2b there are also shown optical sensors 111 (see FIG. 2a) each comprising an optical fiber 112, an optical emitter 116, and optical receivers 118. The optical fibers 112 are attached to the inner side 114 of an enclosure wall 120 along a distance from a first end portion 230 to a second end portion 231 of the enclosure wall 120. The optical fibers 112 may be e.g. glued to the enclosure wall 120 or attached to the enclosure wall 120 using an adhesive tape. Alternatively or additionally, the fiber 112 may be covered by e.g. foam, a plastic belt, or a metal sheet for fixation. The optical fibers 112 are attached to the enclosure wall 120 such that if the enclosure wall is deformed at a location of the optical fiber 112, the optical fiber 112 will also be deformed and thus follow the deformed shape of the enclosure wall 120. The optical emitters 116, each which may be a solid state laser or light-emitting diode, are each configured to emit an optical signal through the respective optical fiber 112. The optical receivers 118 are configured to receive and detect the optical signal transmitted through the respective optical fiber 112. The optical signal may have a wavelength in the range of e.g. 1.3 µm to 1.55 µm although other wavelengths may be appropriately chosen and is not limiting to the disclosure. If the optical fiber 112 is deformed, for example bent, the optical transmission through the optical fiber is altered. An example function of loss of light versus the amount of intrusion of an energy storage enclosure causing a deformation of an optical fiber is shown in FIG. 5. This type of data (loss of light versus intrusion which is related to the amount of deformation of the optical fiber) may be predetermined and later used for predicting a deformation of an enclosure wall based on the detected optical signal. For example, the optical transmission may be decreased (e.g. attenuation of the transmitted optical signal due to for example increased losses in the optical fiber) or the time of flight of the optical signal through the optical fiber may be altered. Thereby, if the enclosure wall 120 is deformed in a location where the optical fiber 112 is attached, the optical fiber 112 will be deformed accordingly and thus the optical signal through the optical fiber 112 will be altered. In this way, the deformation of the enclosure wall 120 may be detected.

In that regard, for such detection, the optical sensors described herein may further comprise one or more processors, microprocessors, microcontrollers, programmable digital signal processors or other programmable devices, which may include memory. The optical sensors may also, or instead, comprise an application specific integrated circuit, a programmable gate array or programmable array logic, a programmable logic device, or a digital signal processor. Where the optical sensors comprise a programmable device such as a processor, microprocessor, microcontroller or programmable digital signal processor mentioned above, the optical sensors may further comprise computer executable code stored in memory that when executed controls operation of the optical sensors and/or performs the functions and/or operations described herein.

As shown in the embodiment of FIG. 2.b (also seen in FIG. 2a), there is more than one optical fiber 112 attached to the inner side 114 of the enclosure wall 120. For example, there is a second optical fiber 112" attached to the enclosure wall spaced apart from a first optical fiber 112'. In this embodiment, the first optical fiber 112' and the second optical fiber 112" has a respective optical emitter 116', 116" and optical receiver 118', 118". However, it would be possible for optical fibers 112', 112", and the optical receivers 118', 118" to share a single optical emitter 116' or 116" by guiding the optical signal from the emitter to both the optical fibers 112', 112". By individually detecting alterations of optical signals transmitted through the first 112' and the second optical fiber 112", a location of a deformation of the enclosure wall 120 may more accurately be determined. For example, it is possible to have knowledge of the location of the optical fibers 112', 112", e.g. the first optical fiber 112' is arranged in a first region/location 134 and the second optical fiber is arranged in a second region/location 136 of the enclosure wall 120. If an alteration of the optical signal through the second optical fiber 112" is detected, it may be determined that the deformation is in the second region 136. Furthermore, there may be optical fibers having respective optical receivers and optical emitters arranged on enclosure walls (e.g. enclosure wall 138, or any of the other enclosure walls, not numbered) other than the first enclosure wall 120. Thereby, it is possible to determine which of the enclosure walls has been deformed.

Although depicted in the embodiments that each of the optical fibers 112 has a respective optical receiver 118 and a respective optical emitter 116, it may be possible that an optical emitter provides an optical signal for more than one optical fiber, e.g. two optical fibers may share a single optical emitter.

An optical fiber 112 in the embodiments may be single core or multiple core optical fiber known in the art. For example, the optical fiber 112 may be made from quartz glass or plastic material. The core of a single core optical fiber may be e.g. 8 µm to 12 µm. The optical signal may be constant (e.g. continuous) or modulated in intensity. The optical signal may be constant in intensity.

The optical sensor(s) 111 may be connected to a control unit 102, 102' which may be one of an control unit of a supplement restraint system 102' of the vehicle in which the energy storage module 300 is arranged, or the control unit may be a control unit 102 of the energy storage module itself (e.g. part of the battery management system). The control unit (e.g. a microprocessor) may together with the energy storage module form an energy storage system 400 according to an embodiment of the disclosure.

The control unit 102, 102' is configured to determine a severity of an impact on the energy storage enclosure 110 based on the detected alterations of optical signals transmitted through optical fibers. The severity may be determined to be e.g. "low", "medium", or "high" (other classifications are of course possible) based on one of the magnitude of a deformation or a location of the deformation, or a combination of magnitude and location of the deformation. For example, if it is determined that the intrusion on the energy storage enclosure (sensed by detecting the alteration in the optical signal resulting from e.g. a bending radius on the fiber or an amount of compression on the fiber) of the optical fibers 112 exceeds a high threshold the severity may be determined to be "high" and a warning message may then instruct the driver via a user interface 240 to immediately pull over and turn off the vehicle. A high threshold may be in the range 12 mm to 30 mm or any number in that range, e.g. 15 mm, 18 mm, 20 mm, or 25 mm. If the intrusion does not exceed the high threshold, but only a medium threshold, the severity may be "medium" and the driver may be instructed to drive to the nearest service station. A medium threshold may be in the range 6 mm to 20 mm or any number in that range, e.g. 8 mm, 10 mm, 12 mm, or 15 mm. If the intrusion does not exceed the medium threshold or alternatively a lower threshold (e.g. "low"), there will be no warning message. The description herein of the severity levels of "high", "medium", and "low" only serve as an example and other definitions may of course be possible. Furthermore, the severity also depends on the location of the deformation (or intrusion). For example, a small intrusion in a sensitive location (e.g. close to sensitive parts of the energy storage module) may also result in a "high" severity. In other words, the severity depends on both the amount of intrusion and on the location of the intrusion. It is equally applicable to compare voltage signals from the optical sensors to voltage thresholds in order to determine the severity. Furthermore, it may be known where in the energy storage module 300 sensitive parts are placed. Thus, if it is determined that a deformation occurred in a region close to the sensitive parts, a higher severity may be determined than if the deformation occurred in a region not close the sensitive parts. Sensitive parts may be e.g. elements of the cooling system (e.g. pipes) of high voltage components on e.g. printed circuit boards, and/or the energy storage cells. The control unit 102, 102' together with the energy storage module 300 form an energy storage system 400.

Figure 3:
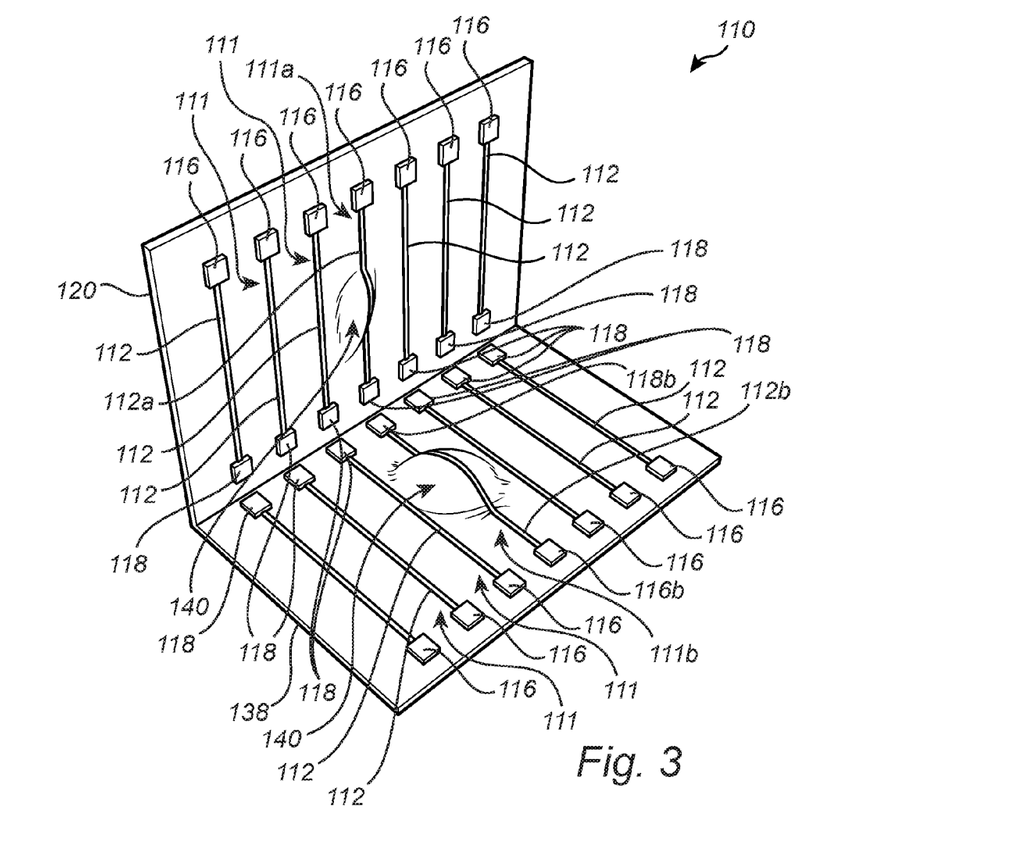
FIG. 3 shows a partial view of an example energy storage enclosure with optical sensors.

FIG. 3 shows a partial view of an energy storage enclosure 110 having several optical sensors 111, 111a-b arranged therein. Each of the optical sensors 111 has an optical fiber 112, an optical emitter 116, and an optical receiver 118. In this view of the energy storage enclosure 110 there is shown a first 120 and a second energy storage enclosure wall 138. The second wall 138 may for example be a bottom wall of the energy storage enclosure 110. Furthermore, the energy storage enclosure 110 has been exposed to external forces; thereby a deformation 140 has been formed on both the first 120 and the second wall 138. The deformation 140 causes a local alteration of the shape/form of the respective wall 120, 138. Furthermore, there is an optical fiber 112a, 112b attached to the enclosure walls at the locations of the deformations 140. Since the optical fibers 112a-b are attached such that they are also deformed as a result of the deformed enclosure wall(s) 120, 138, the optical transmission properties are altered in the optical fibers 112a-b attached at the deformations. For example, the optical fibers 112a-b attached to the enclosure wall 120, 138 at the deformations 140 (the optical fibers extending across the deformations) are bent or pressed in the part of the optical fiber 112a-b near and at the deformation. The optical transmission properties are modified as a result of the bending (or pressing) of the optical fiber 112a-b, and thereby the deformation may be detected as described with reference to the previous drawings. Furthermore, by relating the optical sensor 111a, 111b (or the respective optical fiber 112a-b) which detected a deformation to the enclosure wall where it is arranged (i.e. to which wall the respective optical fiber is attached), it is possible to locate the deformation in terms of which enclosure wall 120, 138 is deformed. Furthermore, by relating the location of the optical fiber 112a-b on the enclosure wall, it is possible to determine in which region of the enclosure wall the deformation occurred. This may be used to determine at least partly the severity of the deformation.

Figure 4:
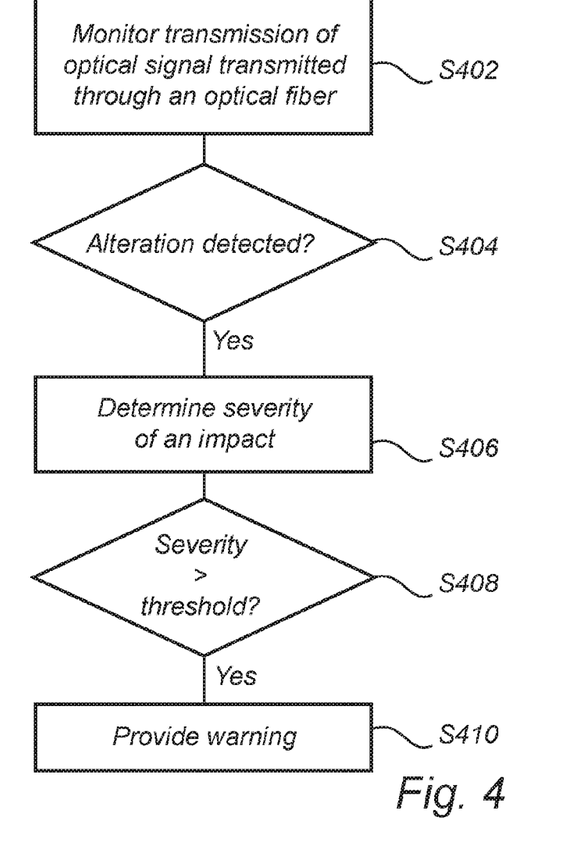
FIG. 4 provides a flow-chart of method steps according to an embodiment of the disclosure.

FIG. 4 provides a flow-chart with method steps according to an embodiment of the disclosure. The method is for assessing a deformation of an energy storage enclosure for an energy storage module. The energy storage enclosure comprises at least a first enclosure wall. Furthermore an optical fiber is attached to the first enclosure wall. Firstly S402, the transmission of an optical signal transmitted through the at least one optical fiber is monitored. Subsequently, in step S404 an alteration of the optical signal is determined/detected. Based on the alteration of the optical signal, a severity of an impact on the energy storage module may be determined S406. Furthermore, if the severity exceeds a threshold as determined in step S408, a warning message may be provided S410 to a user. The warning message may be provided via a user interface of a vehicle using the energy storage module, or via an external device connected to a control unit of the vehicle. The warning message may be in the form of a visual message (e.g. picture or text) or via a sound signal/message.

Additionally, variations to the disclosed embodiments can be understood and effected by the skilled person in practicing the claimed disclosure, from a study of the drawings, the disclosure, and the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An energy storage module for a vehicle, the energy storage module comprising:
    an energy storage enclosure adapted to accommodate at least one energy storage cell, the energy storage enclosure having at least one enclosure wall; and
    at least a first optical sensor arranged in the energy storage enclosure and including at least a first optical fiber, at least a first optical receiver and an optical emitter, the first optical fiber attached to an inner side of a first enclosure wall of the energy storage enclosure, the first optical fiber attached to the inner side along a distance of at least a portion of the inner side, the optical emitter configured to emit an optical signal through the first optical fiber, and the first optical receiver configured to detect the optical signal transmitted through the first optical fiber;

wherein the first optical sensor is configured to detect an alteration of the optical signal, the alteration being indicative of a deformation of the first enclosure wall.

2. The energy storage module according to claim 1 further comprising a second optical sensor comprising a second optical fiber attached to the same first enclosure wall as the first optical fiber and spaced apart from the first optical fiber, and a second optical receiver configured to detect an optical signal transmitted through the second optical fiber, wherein the second optical sensor is configured to detect an alteration of the optical signal transmitted through the second optical fiber.

3. The energy storage module according to claim 1 further comprising a second optical sensor comprising a second optical fiber attached to an enclosure wall of the energy storage enclosure different from the enclosure wall to which the first optical fiber is attached, and a second optical receiver configured to detect an optical signal transmitted through the second optical fiber, wherein the second optical sensor is configured to detect an alteration of the optical signal transmitted through the second optical fiber.

4. The energy storage module according to claim 2 wherein the second optical sensor comprises an optical emitter.

5. The energy storage module according to claim 2 wherein the second optical sensor shares the optical emitter of the first optical sensor.

6. The energy storage module according to claim 1 wherein the alteration of an optical signal is an alteration of an optical transmission property of the optical fiber.

7. The energy storage module according to claim 1 wherein the optical sensor is connected to a control unit, the control unit configured to determine a magnitude and/or a location of the deformation of the enclosure wall based on the detected alteration of an optical signal.

8. The energy storage module according to claim 7 wherein the control unit is configured to determine a severity of an impact based on the detected alteration of any of the optical signals.

9. The energy storage module according to claim 8 wherein the severity is determined based on determining a location of a deformation of an enclosure wall, the location determined by relating a detected alteration of an optical signal transmitted through the optical fiber to the location of the optical fiber.

10. The energy storage module according to claim 8 wherein the severity is determined based on a magnitude of the deformation of the enclosure wall, the magnitude determined by relating the alteration of the optical signal through the optical fiber to a deformation of the optical fiber.

11. The energy storage module according to claim 7 further comprising the control unit.

12. The energy storage module according to claim 11 wherein the control unit is configured to transmit a warning signal to a user interface in case the severity exceeds a threshold.

13. The energy storage module according to claim 9 wherein the control unit is one of a control unit of a supplement restraint system for the vehicle or a control unit of a battery management system control unit of the energy storage module.

14. An energy storage module for a vehicle, the energy storage module comprising:

an energy storage enclosure adapted to accommodate an energy storage cell, the energy storage enclosure having an enclosure wall; and an optical sensor arranged in the energy storage enclosure and including an optical fiber, an optical receiver and an optical emitter, the optical fiber attached to an inner side of the enclosure wall of the energy storage enclosure along a distance of a portion of the inner side, the optical emitter configured to emit an optical signal through the optical fiber, and the optical receiver configured to detect the optical signal transmitted through the optical fiber;

wherein the optical sensor is configured to detect an alteration of the optical signal, the alteration being indicative of a deformation of the first enclosure wall.

* * * * *